United States Patent [19]
Hendrix

[11] Patent Number: 4,788,708
[45] Date of Patent: Nov. 29, 1988

[54] UNIVERSAL HEADSET TESTER
[75] Inventor: Gary Hendrix, San Antonio, Tex.
[73] Assignee: Tele-Technix, Inc., San Antonio, Tex.
[21] Appl. No.: 125,569
[22] Filed: Nov. 25, 1987
[51] Int. Cl.[4] .................... H04R 29/00; H04M 1/24
[52] U.S. Cl. ........................................ 379/6; 379/1; 379/32
[58] Field of Search .................. 379/6, 21, 32, 1; 381/25, 60, 74, 183, 124

[56] References Cited
U.S. PATENT DOCUMENTS
4,674,123  6/1987  Michas ................................ 381/60

Primary Examiner—Stafford D. Schreyer
Attorney, Agent, or Firm—Gunn, Lee & Jackson

[57] ABSTRACT

A device for testing performance of telephone headsets. The device performs reception, transmission, reception distortion, transmission distortion, reception limiting, and current consumption testing, as well as allowing these same tests with reverse polarity. The complete headset may be tested, or just the bottom or top units may be tested, as well as auxiliary power packs. The tester is designed to be used with any conventional headset, regardless of variations in the specifications, such as power supply. The tester may be programmed for an automatic testing mode.

38 Claims, 9 Drawing Sheets

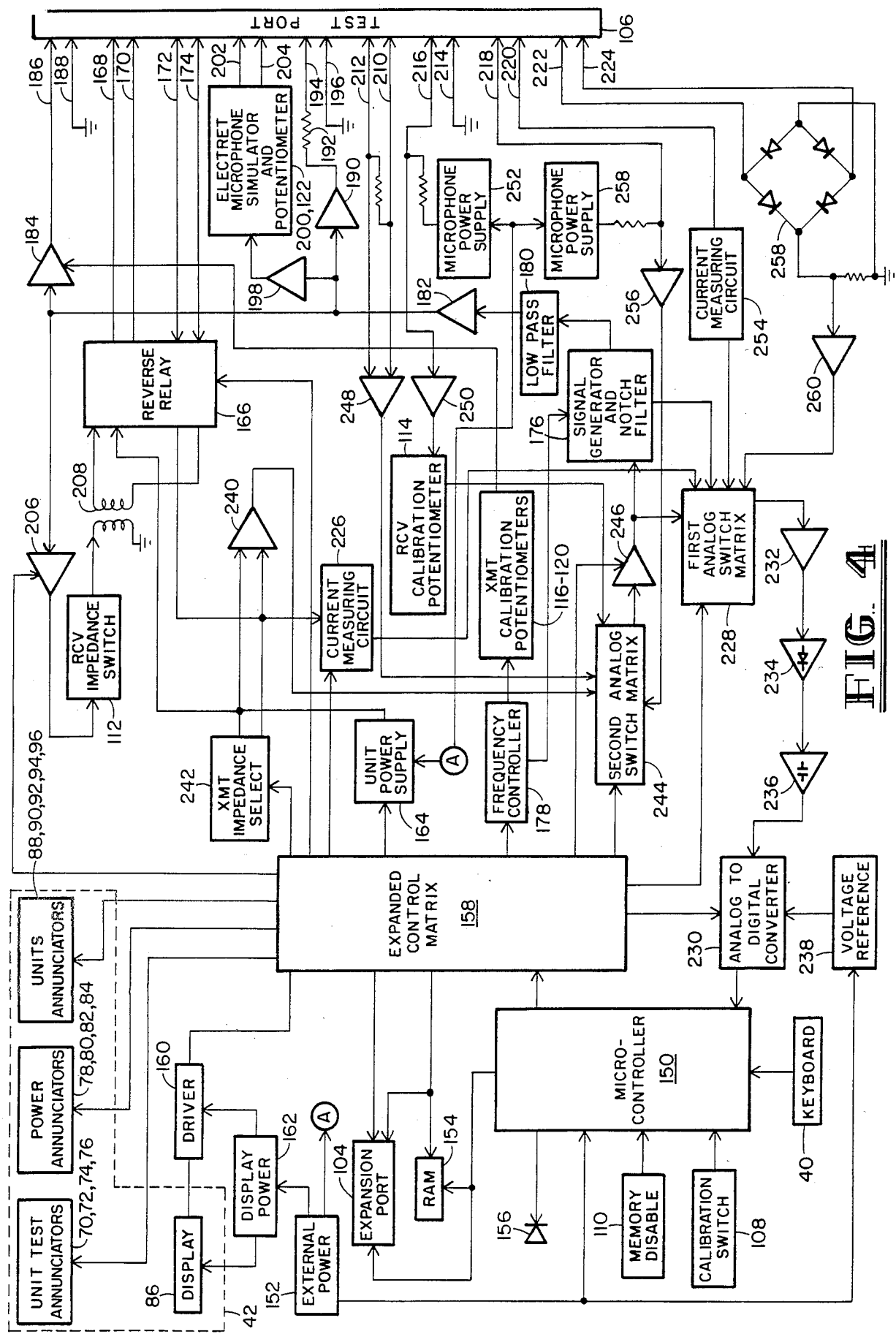

UNIVERSAL HEADSET TESTER

BACKGROUND OF THE INVENTION

1. Field of the Invention

The present invention generally relates to electronic testing units, and more particularly to a testing unit designed to analyze headsets used in conjunction with communications equipment.

2. Description of the Prior Art

Anyone who has ever been in a large office, or worked in the communications industry, is familiar with the headsets used by receptionists and operators which allow discussion on telephone lines while keeping the hands free. These headsets typically have "top" and "bottom" portions, the top portion being that part of the headset that actually rests on the head, including the earpiece/speaker and the mouthpiece/microphone, and the bottom portion being an amplifier stage (sometimes with an auxiliary power pack) which is connected to the top portion via a normal telephone cord.

The companies which manufacture headsets, as well as certain regulatory agencies, like the FCC, have established performance specifications for these units. Specifically, manufacturers and users are concerned with reception and transmission quality (in terms of amplitude retention as well as distortion), reception limiting (so that an earpiece/speaker does not deafen the user), and current consumption of the headsets. Therefore, there is a clear need for a device which can perform all of these tests on headsets as they leave the factory, as well as for follow-up maintenance testing.

Certainly, devices have been invented which are related to testing of communications equipment. For example, U.S. Pat. No. 3,927,281 issued to F. Bradley, discloses an instrument for measuring harmonic distortion in telephone transmissions. Another U.S. Pat. No. 4,301,536 issued to Favin et al., describes a system for measuring frequency response and distortion in a network employing a 21-tone signal. U.S. Pat. No. 4,340,854 issued to Jones et al., discusses a unique distortion measurement system employing a two-state variable filter circuit. Another distortion measuring device is depicted in U.S. Pat. No. 4,417,310 issued to K. Sugihara, incorporating a digital filtering technique. Another patent issued to Favin et al., U.S. Pat. No. 4,417,337, sets forth a method for generating a measurement of various transmission parameters for a communications network. Finally, U.S. Pat. No. 4,623,837 issued to Efron et al., shows a system for automated product testing of audio/video units.

Unfortunately, none of these devices is directed to the testing of telephone headsets. In fact, the inventor knows of only one apparatus designed for this purpose, namely the headset tester manufactured by Plantronics, of Santa Cruz, Calif. This device, however, has several drawbacks. First of all, it possesses no capability of measuring distortion. Furthermore, it sends a signal at only one frequency and does not cover the entire audible spectrum. Finally, and perhaps most importantly, it does not provide automatic testing capability. It would, therefore, be desirable and advantageous to devise a headset tester which can perform all of the aforementioned tests, and which would also be universal in the sense of being able to test any conventional headset. For factory testing, the device should also be able to perform automated test sequences.

SUMMARY OF THE INVENTION

Accordingly, the primary object of the present invention is to provide an apparatus for testing performance qualities of a telephone headset.

Another object of the invention is to provide such an apparatus which can perform reception, transmission, reception distortion, transmission distortion, reception limiting, and current consumption testing.

Still another object of the invention is to provide a headset tester which can be used on several different kinds of headsets.

Yet another object of the invention is to provide a universal headset tester which can test the complete unit, or just the top or bottom units.

A further object of the invention is to provide such a tester which may be programmed by the user for special test sequences.

The foregoing objects are achieved in a universal headset tester comprising a keyboard, a display area, processor means responsive to said keyboard, and special means for coupling the device to a headset. Test signals are calibrated, and sent at three different audible frequencies. The polarity of the power being supplied to the headset may also be reversed. The user may additionally set up a sequence of tests, including pass/fail criteria, which will be automatically executed by the tester.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of illustrative embodiments when read in conjunction with the accompanying drawings, wherein:

FIG. 4 is a block schematic diagram of the electrical components of the universal headset tester.

FIG. 5 is a flow chart of the preliminary steps for use of the invention.

FIG. 6 is a flow chart of the receive test subroutine.

FIG. 7 is a flow chart of the transmit test subroutine.

FIG. 8 is a flow chart of the transmit distortion test subroutine.

FIG. 9 is a flow chart of the receive distortion test subroutine.

FIG. 10 is a flow chart of the current test subroutine.

FIG. 11 is a flow chart of the receive limit subroutine.

DESCRIPTION OF THE PREFERRED EMBODIMENTS

Figure 1:
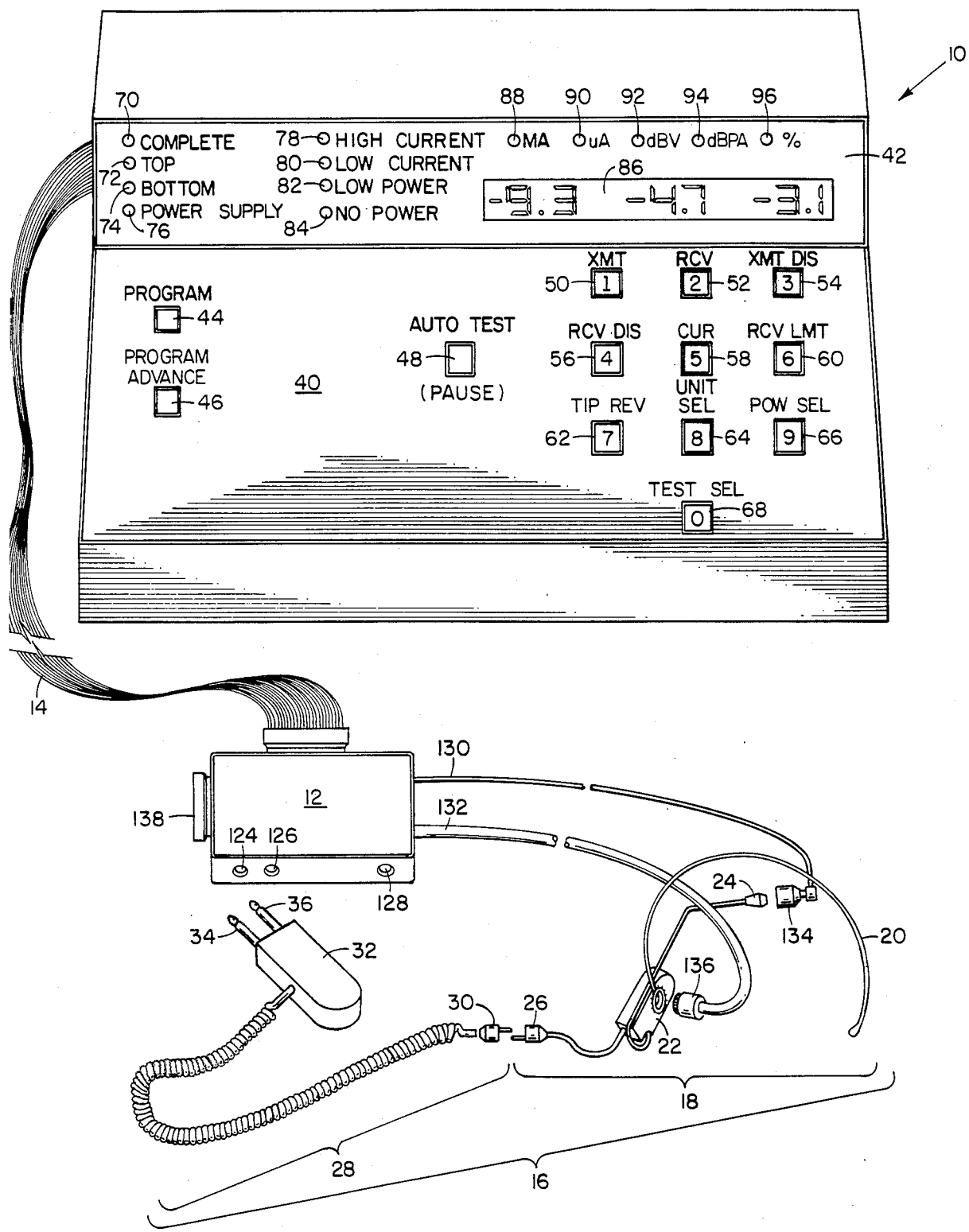
FIG. 1 is a front elevational view of the universal headset tester of the present invention shown with the remote test head and an exemplary headset to be tested.

With reference now to the figures, and in particular with reference to FIG. 1, there is depicted a universal headset tester 10. Universal headset tester 10 is designed to simplify telephone headset testing by providing useful data on headset performance. Tester 10 is configured to perform a wide variety of tests on headsets, including automatic testing capability. As further discussed below, tester 10 can be used on nearly all headsets or headset subassemblies currently available, including those manufactured by ACS Communications, Inc., of Scotts Valley, Calif.; Plantronics, Inc., of Santa Cruz, Calif.; and Danavox of Minneapolis, Minn., among others.

Also shown in FIG. 1 is a remote test head 12 connected to universal headset tester 10 by a cable 14, and an actual headset 16 to be tested. Remote test head 12 has a number of ports and jacks for connection to the various parts of headset 16, explained in further detail below. Having a test head remote from tester 10 simplifies use of the device. Headset 16 is typically comprised of two parts: a top unit 18 consisting of head strap 20, earpiece 22, mouthpiece/microphone 24, and QD (quick-disconnect) connector 26; and a bottom unit 28 consisting of another QD connector 30 and amplifier 32. Bottom units usually have two ACD male jacks 34 and 36.

Mounted on the front side of tester 10 are a keyboard 40 and display panel 42. Keyboard 40 contains a plurality of buttons or switches used in programming and running headset tests. "Program" switch 44 and "program advance" switch 46 are utilized in programming tester 10 for automatic testing. "Auto test" switch 48 is used to activate the automatic testing mode, and may also be used to insert a pause in a given automatic test procedure. "XMT" switch 50 begins transmission testing, while "RCV" switch 52 begins receive testing. "XMT DIS" switch 54 and "RCV DIS" switch 56 are used to test-transmission and receive distortion, respectively. "CUR" switch 58 is used to check current flow to the unit. "RCV LMT" switch 60 is employed to check the limiting of incoming signals to headset 16. "TIP REV" switch 62 reverses the polarity on the power supply to headset 16. "UNIT SEL" switch 64 and "POW SEL" switch 66 are used to chose the type of unit being tested and its corresponding power usage. Finally, "TEST SEL" switch 68 is used to select which of the preprogrammed tests is to be run in the automatic testing mode. Switches 48 through 68 are also used during automatic test programming to input numeric information. The purpose of each of these switches will become clear in the ensuing discussion.

Display panel 42 has essentially three display areas, one for unit test annunciators 70–76, another for power annunciators 78–84, and a third for alphanumeric display 86 and its corresponding units annunciators 88–96. Unit test annunciators 70–76 indicate what kind of unit is to be tested, and are actuated by "UNIT SEL" switch 64. If both the top and bottom units 18 and 28 are to be tested, annunciator 70 should be illuminated. If only one of the top unit 18 or bottom unit 28 is to be tested, then either annunciator 72 or annunciator 74, respectively, should be illuminated. If the power supply for the unit is to be tested (in those cases where the headset 16 is provided with an independent power source), then annunciator 76 should be illuminated.

Annunciators 78 through 84 are used to indicate the type of power source used by headset 16. Most headsets employ an external power source which is supplied through the telephone system. Standard headsets operate off a current of between 10 and 200 milliamps (usually about 80 ma). This current may be provided at two voltages, either around twenty-four volts or about four and one-half volts. Some new headsets instead operate off a current of several hundred microamps. The high current annunciator 78 illuminates when the headset being tested is running on 80 ma at twenty-four volts, while the low current annunciator 80 illuminates when the headset is running on 120 ma at four and a half volts. Low power annunciator 82 illuminates if the unit runs on microamperage. Finally, as alluded to above, some units employ a power pack that is independent of the telephone system. Annunciator 84 will illuminate when a power pack is being used.

The last area on display panel 42 is the alphanumeric display 86. Display 86 reads out the test values according to the various tests which may be run. If a current check is being run, annunciators 88 ("MA") or 90 ("uA") will illuminate depending on whether the unit operates on milli- or microamps. When voltages are being measured, the "dBV" (decibel volts) annunciator 92 will illuminate. If acoustic signals are being measured, then the "dBPA" (decibel Pascals) annunciator will illuminate. If distortion tests are being performed, then the "%" annunciator 96 will illuminate indicating that the readout is a percentage. Moreover, whenever annunciators 92, 94 or 96 are illuminated, three numbers will appear on display 86. These three numbers, from left to right, correspond to the relevant measurement at 300 Hz., 1000 Hz, and 3000 Hz., respectively. By testing at three different frequencies, universal headset tester 10 provides more realistic test results across the spectrum of audible signals.

Figure 2:
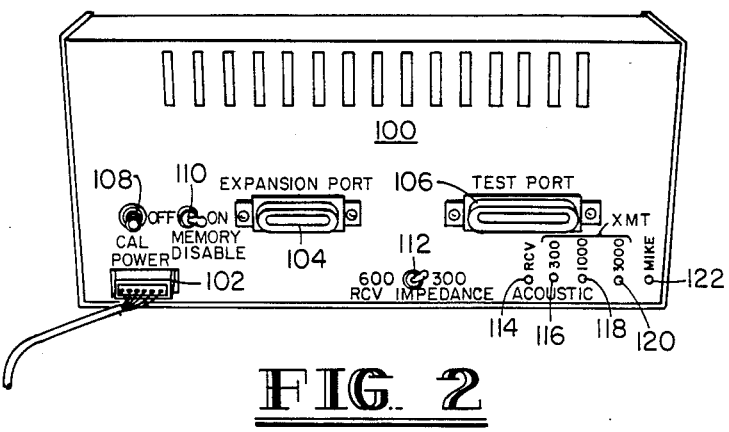
FIG. 2 is a rear elevational view of the universal headset tester.

With reference now to FIG. 2, the rear panel 100 of tester 10 is explained. Rear panel 100 has three ports, a power port 102 for connection to an external power source (120 volts AC), an expansion port 104 for connection to an optional external memory storage device (explained in the operation section below), and a test port 106 for connection to test head 12 via cable 14.

There are also three switches on rear panel 100. A calibration button 108 is used to set offset values for the microphone used in receive testing (discussed below). This microphone typically does not have a flat response curve, so offsets are needed to obtain proper signal transmission at the three aforementioned frequency levels. Specifically, the microphone is usually set to have a zero dB output at 1000 Hz., and typically requires about a ±3 dB offset for 300 Hz., and a ±3 dB offset for 3000 Hz. The offset values may be entered through keyboard 42 when calibration button 108 is depressed. Another switch, memory disable switch 110, is used to protect the random access memory (discussed below) in which the microphone offset values and automatic testing parameters are stored. A third switch, RCV impedance switch 112, is used to adjust the impedance for the amplifier 32 in the bottom unit 28 of headset 16. Most amplifiers are require a 300 ohm impedance, but some newer models are switching to 600 ohm impedance.

The only other features of rear panel 100 are several holes providing access to calibration potentiometers. RCV calibration potentiometer 114 adjusts the circuits within tester 10 which measure the signal emanating from headset earpiece/speaker 22. XMT calibration potentiometers 116, 118, and 120 (for 300 Hz., 1000 Hz., and 3000 Hz., respectively) adjust the circuits relating to the signals injected into headset mouthpiece/microphone 24. Microphone potentiometer 122 adjusts the microphone simulator (discussed below) used when testing a bottom unit 28 only.

Figure 3A:
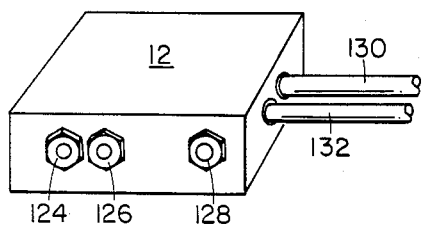
FIGS. 3A and 3B are front and rear perspectives, respectfully, of the remote test head of the present invention.
Figure 3B:
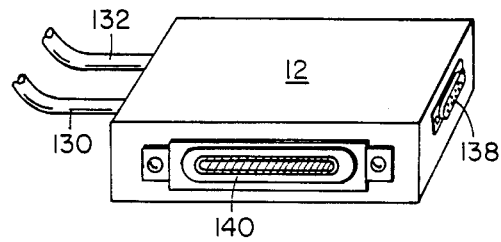

Referring now to FIGS. 3A and 3B, the various ports and jacks on remote test head 12 are explained. Two female ACD connectors 124 and 126 are provided to accommodate male ACD jacks 34 and 36 of amplifier 32. A third connector 128 is provided for testing power packs (for headsets employing an independent power source). Two wires 130 and 132 lead to 2 cc. acoustic couplers 134 and 136 (shown in FIG. 1), respectively. Coupler 134 contains a small speaker and attaches to headset mouthpiece/microphone 24. Coupler 136 contains a small microphone and attaches to headset earpiece/speaker 22. Also emanating from test head 12 is a nine-pin connector 138. Pin connector 138 is used when testing the bottom unit 28 only or top unit 18 only. In this case, the two ACD jacks 34 and 36 still mate with ACD connectors 124 and 126, but the QD connector 30 on bottom unit 28 is no longer connected to the QD connector 26 on top unit 18. Instead, QD connector 30 is coupled to nine-pin connector 138 by an appropriate coupler (not shown). Different couplers may be required to accommodate different types of bottom unit connectors. Finally, all of the aforementioned ports on test head 12 are connected to tester 10 via cable connector 140 which receives cable 14. As those skilled in the art will appreciate, the types of connectors set forth for remote test head 12 are standards in the industry, and are not meant to be limiting. Unconventional headsets employing non-standard connectors may easily be attached to test head 12 through the use of appropriate coupling jacks.

The electronics of universal headset tester 10 may be understood with reference to FIG. 4, which is a block schematic diagram. Tester 10 is essentially regulated by micro-controller 150. Micro-controller 150 is simply a microprocessor having I/O ability and internal erasable, programmable read-only memory (EPROM). A suitable micro-controller is the 8753 model manufactured by Advanced Micro Devices, or the 8751 model manufactured by Intel, Micro-controller is powered by an external power source 152, and is directly connected to random access memory (RAM) 154, expansion port 104, and a speaker 156 for prompting the user. As mentioned above, RAM 154 is used to store certain offset values, as well as automatic testing procedures (described in the operation section below). Keyboard 40 also ties in to micro-controller 150. Micro-controller 150 communicates with the remaining components of tester 10 via an expanded control matrix 158.

Before continuing, it should be understood, as those skilled in the art will appreciate, that the single lines connecting the various components may represent more than one physical wire. For example, the single line connecting micro-controller 150 to expanded control matrix 158 represents six different wires, three for addressing expanded control matrix 158, one for data transmission, and two strobes.

Expanded control matrix 158 consists of a plurality of addressable CMOS latches, known in the art as IC 4099's. In the preferred embodiment, expanded control matrix 158 has seven IC 4099's, two acting as controllers and five acting as slaves. Together, these seven IC 4099's control the other components as explained below.

Expanded control matrix 158, like micro-controller 150, is connected to expansion port 104 and RAM 154. It also controls the driver 160 for display 86. Both driver 160 and display 86 are powered by a display power unit 162, which in turn derives power from the external power source 152. Expanded control matrix 158 further regulates the various unit test annunciators 70, 72, 74, and 76; power annunciators 78, 80, 82, and 84; and units annunciators 88, 90, 92, 94, and 96 (see FIG. 1).

The remaining components of universal headset tester 10 may best be explained in terms of inputs to and outputs from test port 106. There are two primary outputs: (1) a test signal, and (2) power for the unit being tested. Power to the test unit is provided by unit power supply 164, which in turn is powered by the external power source 152. Unit power supply 164 is regulated by expanded control matrix in such a manner as to provide the varying voltages and currents discussed above depending on the type of unit being tested. Unit power supply 164 provides the various power levels by use of a relay and a plurality of resistor circuits. Unit power supply 164 is fed through reverse relay 166 before connecting with test port 106. Reverse relay 166 is regulated by expanded control matrix 158, and is responsive to the "TIP REV" switch 62. Reverse relay 166 consists of a conventional relay, and simply reverses the polarity of power going to ACD jacks 34 and 36 (FIG. 1). In FIG. 4, lines 168 and 170 ultimately connect, through female ACD connectors 124 and 126 in test head 12, with the tip and sleeve, respectively, of ACD jack 34, while lines 172 and 174 connect to the tip and sleeve of ACD jack 36. Power is transmitted through the tips of jacks 34 and 36, i.e., through lines 168 and 172.

The test signals fed to test port 106 essentially emanate from signal generator and notch filter 176, which consists of a digital-to-analog converter. Signal generator and notch filter 176 is commanded by frequency controller 178, which is further regulated by expanded control matrix 158. Frequency controller 178 uses a clock to cause signal generator and notch filter 176 to generate a stairstep sine wave at 300 Hz., 1000 Hz., and 3000 Hz. The stairstep sine wave is fed to a low-pass filter 180 which smooths the signal. The signal passes through a buffer 182 which is calibrated at the factory in order to achieve a zero dBV test signal. This test signal is then routed through several circuits.

For testing transmission quality of complete headset 16, or top unit 18 only, the test signal must be delivered to the speaker in coupler 134 (see FIG. 1). This is accomplished by first feeding the signal through a selectable gain stage 184. As explained above, the microphone in coupler 136 typically does not have a flat response at the three different signal frequencies. Similarly, the speaker in coupler 134 also does not have a flat response. Therefore, selectable gain stage 184 is used to insure that the signal levels being transmitted at the three different frequencies have a zero dBPA output. The frequency-dependent gain settings are adjusted by the calibration potentiometers 116, 118, and 120, and selectable gain stage 184 is controlled by frequency controller 178. In FIG. 4, lines 186 and 188 ultimately connect to coupler 134.

For testing receiving capability of the top unit 18 only of headset 16, the test signal is routed through an attenuation buffer 190, and a 600 ohm resistor 192, to match the impedance of the speaker in earpiece/speaker 22. Lines 194 and 196 are connected, via remote test port 106 and remote test head 12, to nine-pin connector 138 (see FIGS. 3A and 3B) which, for testing top unit 18 only, is further connected to QD connector 26. Lines 194 and 196 eventually lead to earpiece/speaker 22.

For testing transmission qualities of the bottom unit 28 only of headset 16, the test signal from buffer 182 is fed through a second attenuation buffer 198, and an electret microphone simulator 200. Electret microphone simulator 200 provides an artificial signal to bottom unit 28 representing a signal from the missing mouthpiece/microphone 24. The signal emanating from electret microphone simulator 200 may be adjusted by microphone calibration potentiometer 122. Lines 202 and 204 lead to nine-pin connector 138 which, for testing bottom unit 28 only, is coupled to QD connector 30 of bottom unit 28.

For testing receiving capabilities of the complete headset 16, or bottom unit 28 only, the test signal is fed through lines 170 and 174 to female connectors 124 and 126 in test head 12, and thence to the sleeves of ACD jacks 34 and 36. First, however, the signal is directed through another selectable gain stage 206. Selectable gain stage 206 is regulated by expanded control matrix 158, and has three settings, one for normal receive testing, and two for receive limit testing (discussed below). The signal is further passed through a transformer 208 for a balanced output, but only after advancing through RCV impedance switch 112, explained above.

The inputs to test port 106 include: (1) line 172 from ACD jack 36 (or line 168 if reverse relay 166 has been activated); (2) lines 210 and 212 from QD connector 30; (3) lines 214 and 216 from coupler 136; (4) lines 218 and 220 from mouthpiece/microphone 24; and (5) lines 222 and 224 from female ACD connector 128. Each of these inputs is now explained.

The tips of ACD jacks 34 and 36 (lines 168 and 172), referred to above as carrying power to the unit being tested, are also input lines carrying the multiplexed transmission signal from headset 16. Thus two tests may be carried out by examination of the signal passing through this loop, namely, a test of the current consumption of the unit, and a test of the transmission signal. This applies only when the complete headset 16 or bottom unit 28 is being tested; current and transmission tests for top unit 18 involve a different signal path. As shown in FIG. 4, line 172, after passing back through reverse relay 166, proceeds through a current measuring circuit 226. Current measuring circuit 226 consists of a plurality of resistors and a relay, providing different current paths according to the power input by unit power supply 164. Expanded control matrix 158 switches the relay within current measuring circuit 226 according to the supply power. A signal from current measuring circuit 226 representing the value of the current in milliamps or microamps, as the case may be, is sent to a first analog switch matrix 228. Because all test result signals (i.e., xmt, rev, xmt dis, rev dis, cur, and rev lmt) are ultimately directed to first analog switch matrix 228, a brief digression is necessary to explain the function of this component.

First analog switch matrix 228 is a conventional analog switch, such as a CMOS 4051, using FET's to switch. All inputs to first analog switch matrix 228 are routed to an analog-to-digital converter 230, after passing through a buffer 232, a full-wave rectifier 234, and an integrator 236. Buffer 232 is not totally necessary, but is preferred for isolating first analog switch matrix 228 from rectifier 234. Rectifier 234 merely insures that the polarity of the test result signal is appropriate for input into analog-to-digital convertor 230. Integrator 236 acts as a low-pass filter to smooth the test result signal. Analog-to-digital converter 230, using a voltage reference 238 (with power supplied from external power source 152), then sends a digitized signal representing the test result to micro-controller 150. The test result is passed through expanded control matrix 158 and driver 160, and displayed on display 86.

Returning to the discussion of inputs from test port 106, it is now clear from the preceding explanation that the current value forwarded by current measuring circuit 226 to first analog switch matrix 228 is ultimately displayed on display 86.

As mentioned above, the loop from unit power supply 164 to line 168, and line 172 to current measuring circuit 226 carries the transmission signal from headset 16. As shown in FIG. 4, this loop ties in to a differential amplifier 240 which is also affected by XMT impedance select 242. Most headset units are designed to drive into a 50 ohm impedance. However, some a designed for a 1000 ohm load, specifically, those units running on micropower. Therefore, if a low power unit is being tested (selected by "POW SEL" switch 66), expanded control matrix will correspondingly adjust the impedance of XMT impedance select 242 from 50 to 1000 ohms.

The output of differential amplifier 240, representing the transmission signal, is sent to a second analog switch matrix 244. Second analog switch matrix 244 is another CMOS 4051 and merely acts as a receiving station for several of the test result signals. Second analog switch matrix 244 is regulated by expanded control matrix 158. The output of second analog switch matrix 244 is forwarded to another selectable gain stage 246 which, through expanded control matrix 158, has auto-ranging capability. Selectable gain stage 246 attenuates or amplifies the signal as necessary to optimize output accuracy. In the preferred embodiment, is the signal from second analog switch matrix 244 is less than 0.2 volts, then selectable gain stage will amplify the signal by ±20 decibels. If the output signal is more than 2.0 volts, then it will be attenuated by −20 decibels. The signal will remain unchanged if within the range of 0.2 to 2.0 volts. The modified transmission signal from selectable gain stage 246 is then routed to first analog switch matrix 228 and, as detailed above, displayed on display 86.

The next set of inputs from test port 106 relates to receive testing for the bottom unit 28 only of headset 16. Lines 210 and 212, which are connected to QD connector 30 via nine-pin connector 138, act as inputs to another differential amplifier 248. The receive signal from bottom unit 28 is then directed to second analog switch matrix 244, which forwards it to first analog switch matrix 228, and is passed on to display 86.

Lines 214 and 216 are connected, via test head 12, to the microphone in coupler 136 which is used for receive testing on the complete headset 16 or top unit 18. The test signal emitted at earpiece/speaker 22 is picked up by the microphone in coupler 136 and forwarded to buffer 250. A microphone power supply 252 provides the electrical bias needed for the microphone in coupler 136. Microphone power supply is powered by external power source 152. From there, the signal is routed to second analog switch matrix 244 and first analog matrix 228. The receive signal value is then sent to display 86.

As noted above, the loop between lines 168 and 172 is used for testing current and transmission levels from the complete headset 16 or bottom unit 28. For testing current and transmission of top unit 18 only, lines 218 and 220 are employed. These lines are connected to mouthpiece/microphone 24 via QD connector 26 and nine-pin connector 138. Another current measuring circuit 254, similar to current measuring circuit 226, estimates the current running through line 220 and passes this value to first analog switch matrix 228. Line 218 is an input into another buffer 256, which outputs the receive signal to second analog switch matrix 244. Another microphone power supply is provided for mouthpiece/microphone 24.

All of the receive and transmission test signals converge at second analog switch matrix 244. This allows diversion of the signals to signal generator and notch filter 176 before transmission to first analog switch matrix 228. This diversion provides the ability for distortion testing of the signals by notching out the signal at the three different frequencies, and then passing the notched signals to first analog switch matrix 228. The notched signal is routed to micro-controller 150, which compares the noise value to the signal strength, displaying the percent difference on display 86.

The final input from test port 106 is for testing the auxiliary power pack used by some headset units. Lines 222 and 224 are connected to female connector 128, which receives the jack from the power pack (not shown). The current from the power pack passes through a full-wave rectifier 258, rendering the polarity of the power pack immaterial, and a buffer 260, and is fed into first analog switch matrix 228, which forwards the current voltage value to analog-to-digital converter 230 and micro-controller 150.

OPERATION

Figure 5:
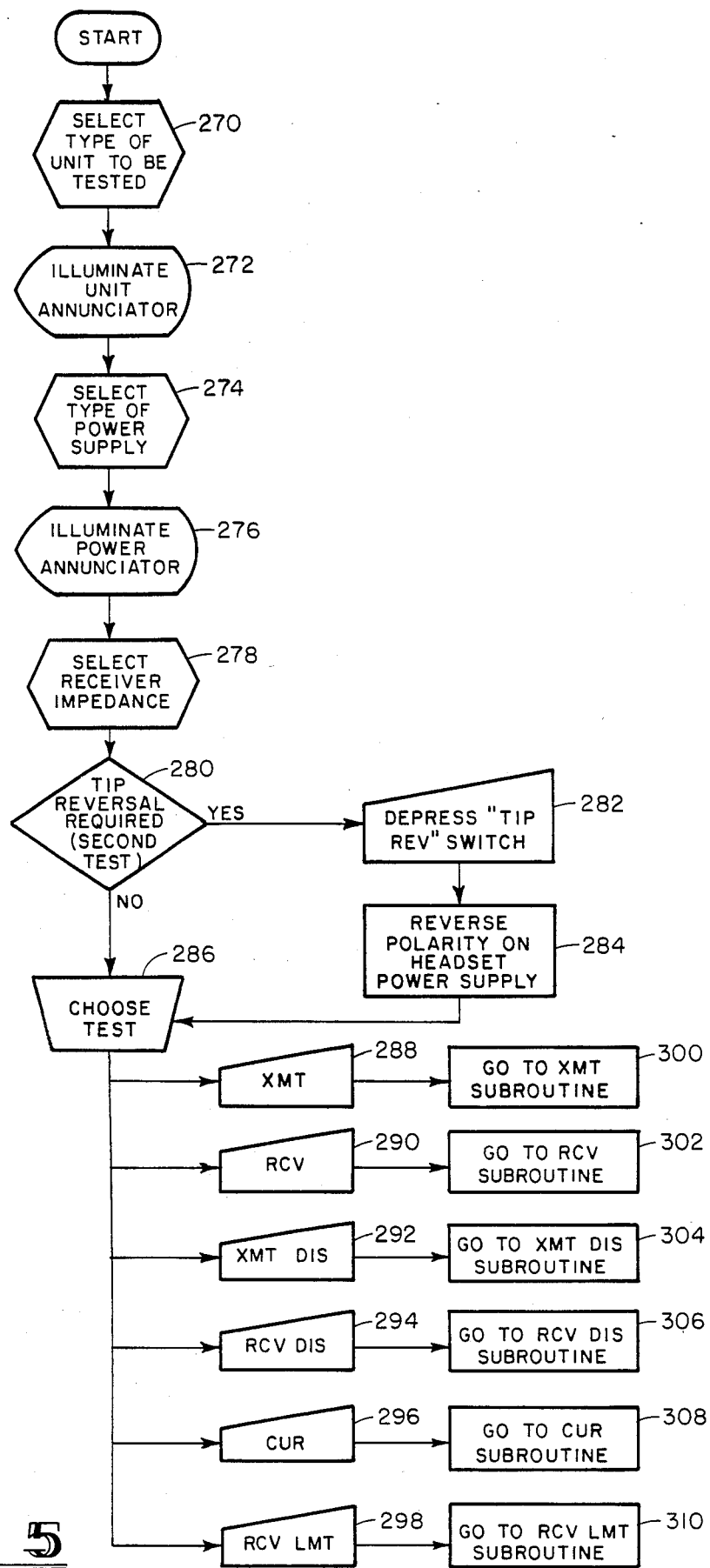
FIGS. 5 through 11 are flow charts showing the path of logic flow executed by the universal headset tester and further illustrating user inputs during testing.

The operation of universal headset tester 10 may best be understood with reference to the flow charts of FIGS. 5-13. FIG. 5 shows the preliminary steps taken in performing manual tests of a headset 16. First, the type of unit to be tested (i.e., complete, top, bottom, or power supply) is selected (270). The appropriate unit test annunciator is illuminated (272). The type of power supply being used is then selected (274), and the appropriate power annunciator is illuminated (276). Next, the proper receiver impedance should be selected (278) by manipulating RCV impedance switch 112. If a first series of tests has already been performed and testing with reverse polarity is desired (280), then "TIP REV" switch 62 should be depressed (282). This will reverse the polarity to the headset power supply (284) as explained above. Finally, the appropriate test is chosen (286). Depending on which test button is depressed (288–298), micro-controller 150 will initiate the corresponding test subroutine (300–310). No matter which test is chosen, test signals are constantly output from signal generator and notch filter 176 and buffer 182.

Figures 6, 7:
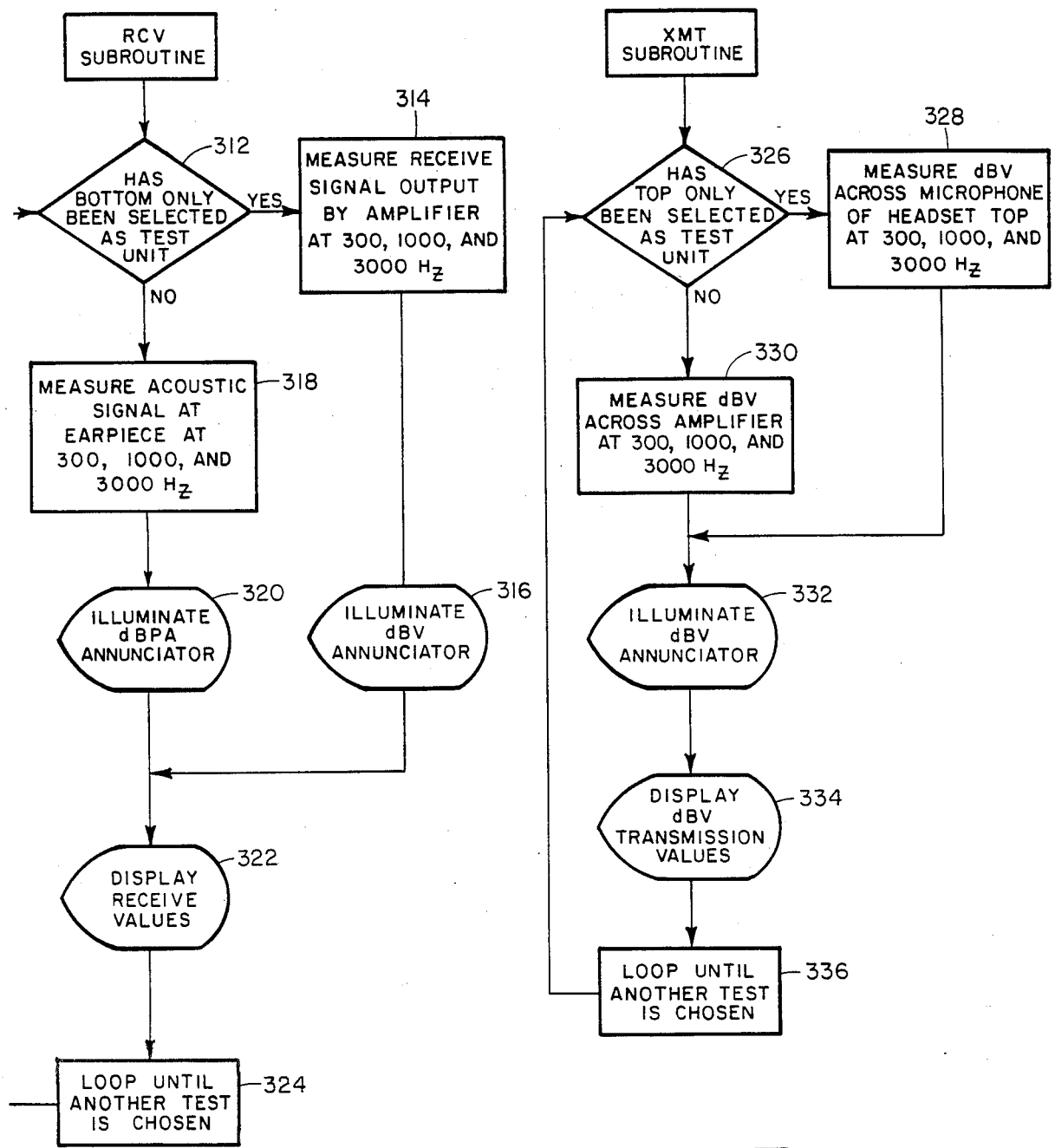

FIG. 6 sets forth the flow of the receive test performed by universal headset tester 10. If the bottom unit 28 only is being tested (312), expanded control matrix 158 will command second analog switch matrix 244 to measure the decibel volt level of the signals coming from differential amplifier 248 (314), and "dBV" annunciator 92 will be illuminated (316). If the complete headset 16 or top unit 18 is tested, second analog switch matrix will draw the receive signals from buffer 250 (318), and "dBPA" annunciator 94 will be illuminated (320). The appropriate signal values will be displayed on display 86 (322), and the measurements will continue until another test is chosen (324).

The transmission test subroutine is depicted in FIG. 7. If the top unit 18 only has been selected (326), expanded control matrix 158 will instruct second analog switch matrix 244 to measure the decibel volt level of the signals emanating from buffer 256 (328). If the complete headset 16 or bottom unit 28 is being tested, second analog switch matrix 244 will pick up the transmission signal from differential amplifier 240 (330). The "dBV" annunciator 92 is illuminated (332), and the decibel volt transmission values at 300 Hz., 1000 Hz., and 3000 Hz. are displayed (334). The transmission signals are continuously monitored until another test is chosen (336).

Figures 8, 9:
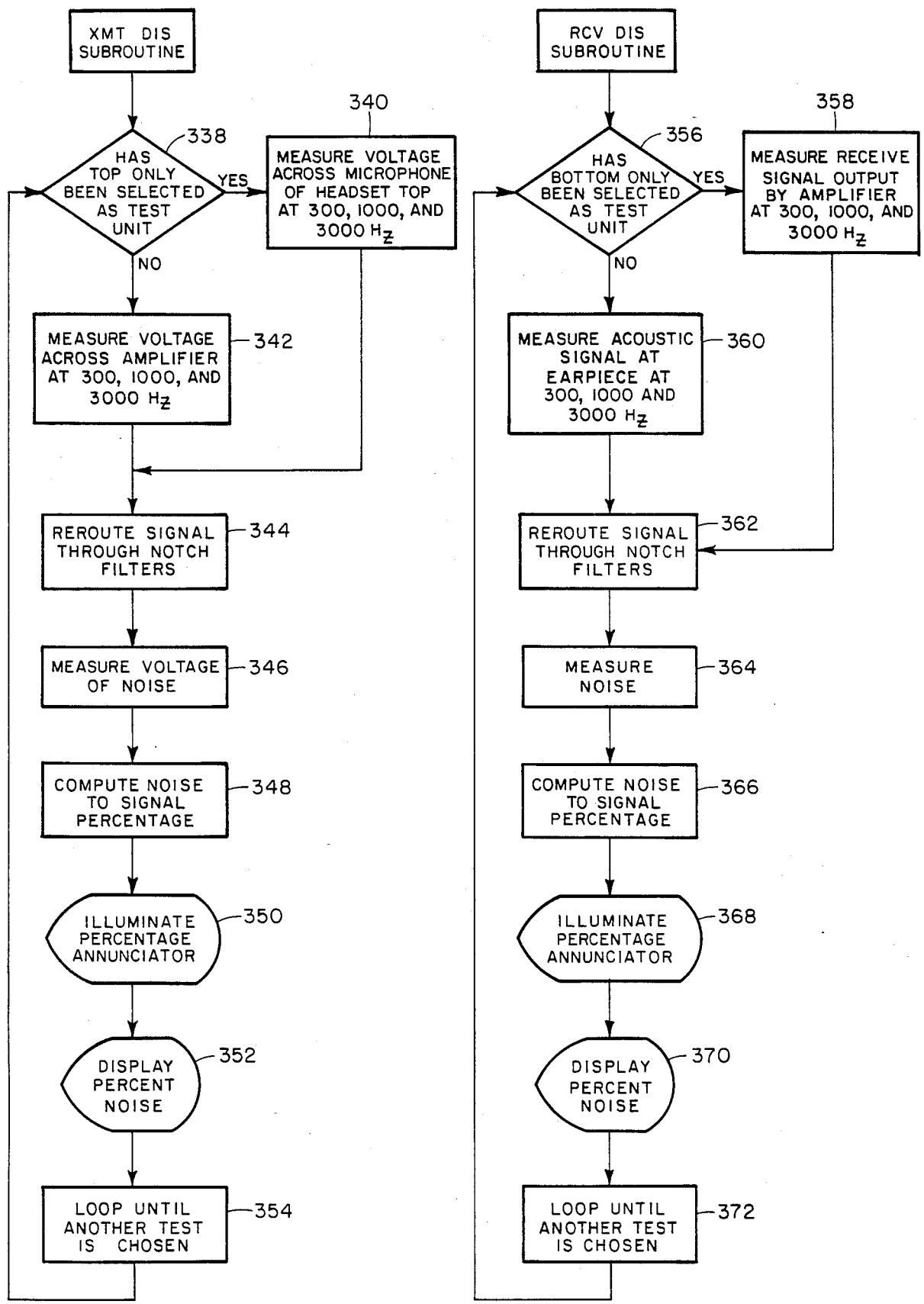

FIG. 8 discloses the steps involved in transmission distortion testing. Micro-controller 150 first determines if the top unit 18 only is being tested (338). If so, voltage is again measured from buffer 256 (340). If not, voltage is measured from differential amplifier 240 as before (342). For distortion testing, first analog switch matrix is instructed to ignore the primary transmission signal from selectable gain stage 246, and instead receives the notched transmission signal from signal generator and notch filter 176 (344). Micro controller 150 measures the amount of noise in the notched signal (346), and compares it to the original test signal (348). The percentage annunciator 96 is illuminated (350), and the percent of noise in the notched signal is displayed (352). Measurement of transmission distortion continues until another test is chosen (354).

The testing scheme for measuring receive distortion is shown in FIG. 9. Depending on whether the bottom unit 28 is being tested (356), the receive signal is captured either from differential amplifier 248 (358) or buffer 250 (360). As with the transmission distortion test, the receive signal passes through signal generator and notch filter 176 (362). The notched signal is measured (364), the noise-to-signal percentage computed (366), the percentage annunciator 96 illuminated (368), and the percentage value displayed (370). Measurement of receive distortion continues until another test is chosen (372).

Figure 10:
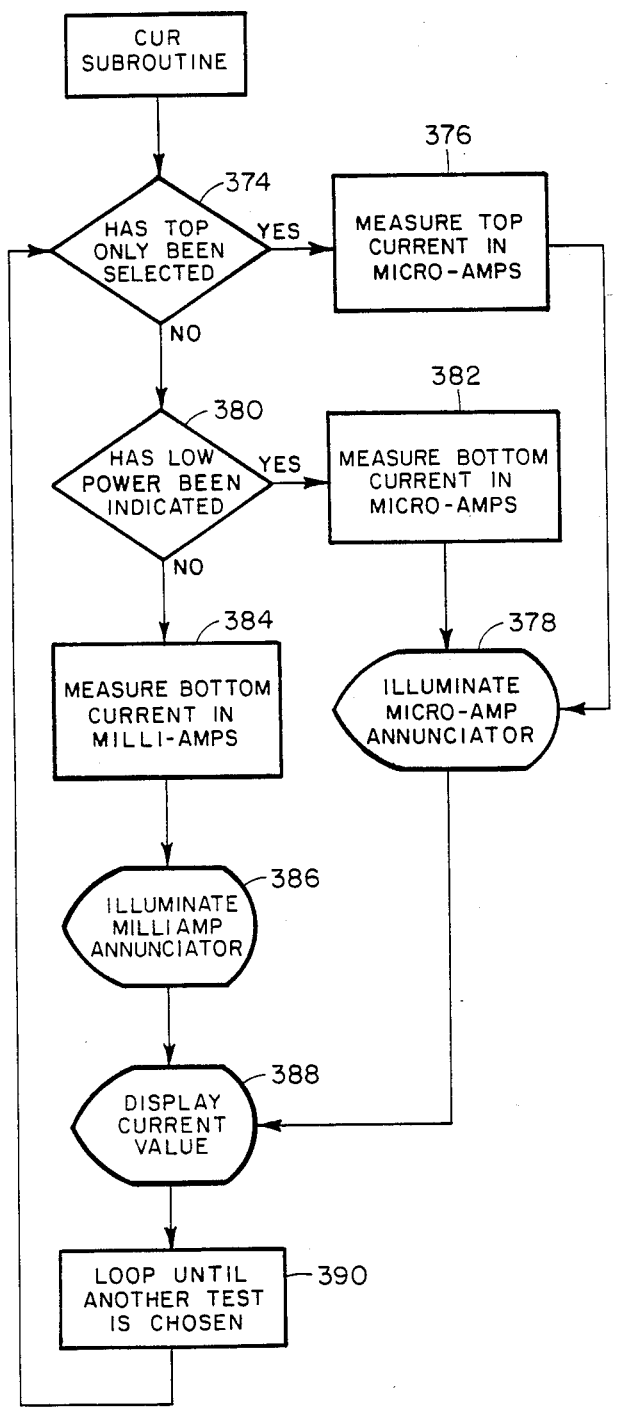

FIG. 10 sets forth the flow of the current test subroutine. Micro-controller 150 first inquires if the top unit 18 only is being tested (374). If so, first analog switch matrix 228 receives the current value from current measuring circuit 254 in microamps (376). Microamp annunciator 90 is then illuminated (378). If the complete headset 16 or bottom unit 28 is being tested, the micro-controller further inquires if a low power supply is being used (380). If so, the current value is taken from current measuring circuit 226 in microamps (382), and microamp annunciator 90 is again illuminated (378). If low power is not being used, the current value is still taken from current measuring circuit 226, but expanded control matrix 158 switches the appropriate relay to measure the current in milliamps (384). The milliamp annunciator 88 is then illuminated (386). The value of the current (in either microamps or milliamps) is displayed (388). Tester 10 will continue to measure current until another test is chosen (390).

Figure 11:
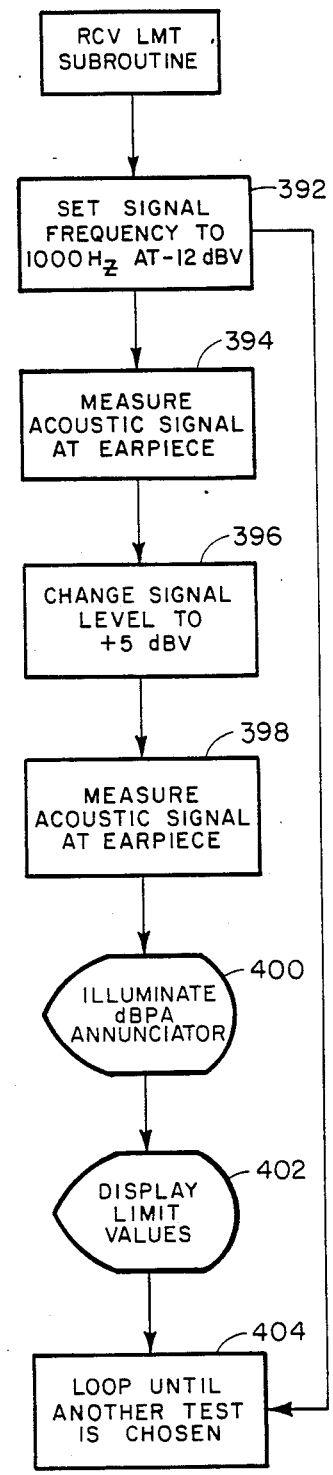

The receive limit test subroutine is depicted in FIG. 11. The amplitude of the test signal being injected into earpiece/speaker 22 is adjusted by selectable gain stage 206, first to −12 dBV (392). The acoustic signal at earpiece/speaker 22 is picked up by the microphone in coupler 136, and its value recorded (394). The amplitude of the injected signal is then changed to +15 dBV (396), and the level of the acoustic signal again recorded (398). The "dBV" annunciator 94 is illuminated (400), and the two limit values are displayed (402). Receive limit testing will continue until another test is chosen (404).

No flow chart is provided in conjunction with the "TIP REV" switch 62. When this key is depressed, expanded control matrix simply switches reverse relay 166. Tip reversal is not a test, but is done is order to perform the preceding tests with reverse polarity going to headset 16.

Figure 12:
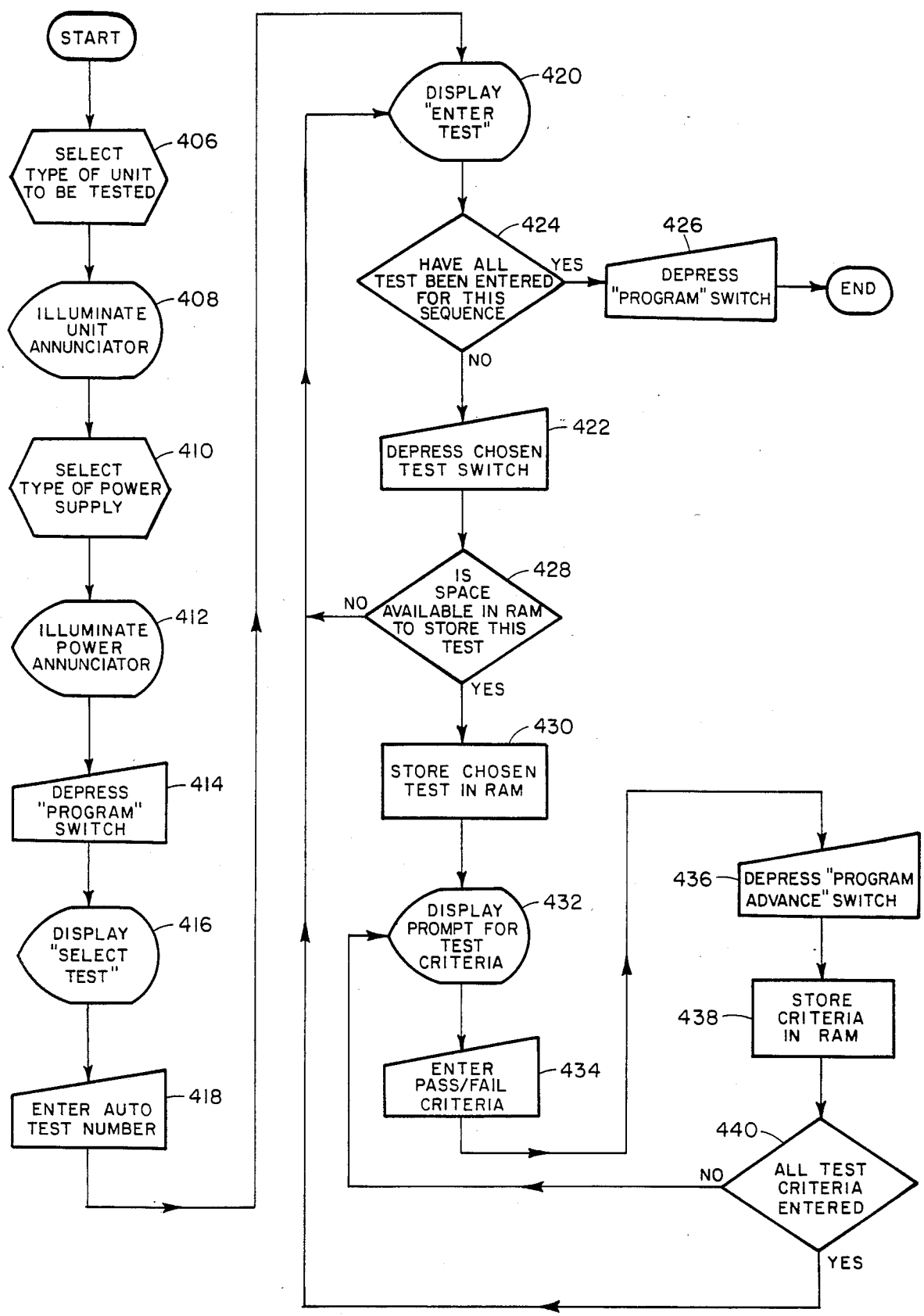
FIG. 12 is a flow chart of the programming steps for using optional automatic testing.

FIG. 12 discloses the steps involved in programming auto tests. In assembly line testing, workers are generally testing only one type of headset, and then only with certain specified tests. Rather than having to manually conduct each test, the universal headset tester 10 may be programmed to initiate a series of tests automatically, the test results being compared to preset acceptable standards.

As in FIG. 5, the first step in automatic programming is to choose the type of unit to be tested (406); the appropriate unit annunciator is illuminated (408). The type of power supply being used is selected (410), and the appropriate power supply annunciator is illuminated (412). The programming mode is initiated by depressing "program" switch 44 (414). Alphanumeric display 86 will then flash the message "select test" (416). The user then pushes one of the ten buttons on keyboard 40 corresponding to the digits 1-7, according to the desired test number for this particular auto test sequence (418). Display 86 will then flash the message "enter test" (420), at which time the user should select the first actual test to be performed in the test sequence (422), unless all such tests have already been entered for this sequence (424), in which case the user again depresses the "program" switch 44 to exit automatic programming (426).

Before accepting test parameters, micro-controller 150 will check to see that sufficient space remains in RAM 154, or in the optional external memory storage device alluded previously alluded to (428). The optional external memory storage device (not shown) is simply an extra RAM bank connected to expansion port 104. Although other information may be stored in the external memory storage device, it is anticipated that its primary use will be to store information on complicated automatic test sequences used at the headset factory. In the preferred embodiment, seven sectors each 128 bytes long are allocated in RAM 154 for automatic testing information. Each separate programmed sequence will reserve at least one sector, and some longer test sequences will require more than one sector. Thus, in heavy industrial applications, the use of an external memory storage device for holding information on long test sequences (or a large number of smaller test sequences) is desirable. If insufficient space exists for recording information on the next test in the sequence, tester 10 will apparently be nonresponsive to further user inputs, continuing to display the message "enter test," alerting the user to the problem.

If sufficient space remains in RAM 154 or the optional external memory storage device, then the chosen test will be recorded (430). Micro-controller will then forward a prompt message to display 86 for inputting test criteria (432). The user then enters appropriate pass/fail criteria. For example, industry specifications may require that transmission distortion levels not exceed, say, five percent, for a particular type of headset. In this case, after "XMT DIS" switch 54 has been depressed (in step 422), the user would enter "05%" at each of the three frequency levels. This information is then recorded (438). After all test criteria are entered for a given test, the next test in the sequence may be entered (440).

Figure 13:
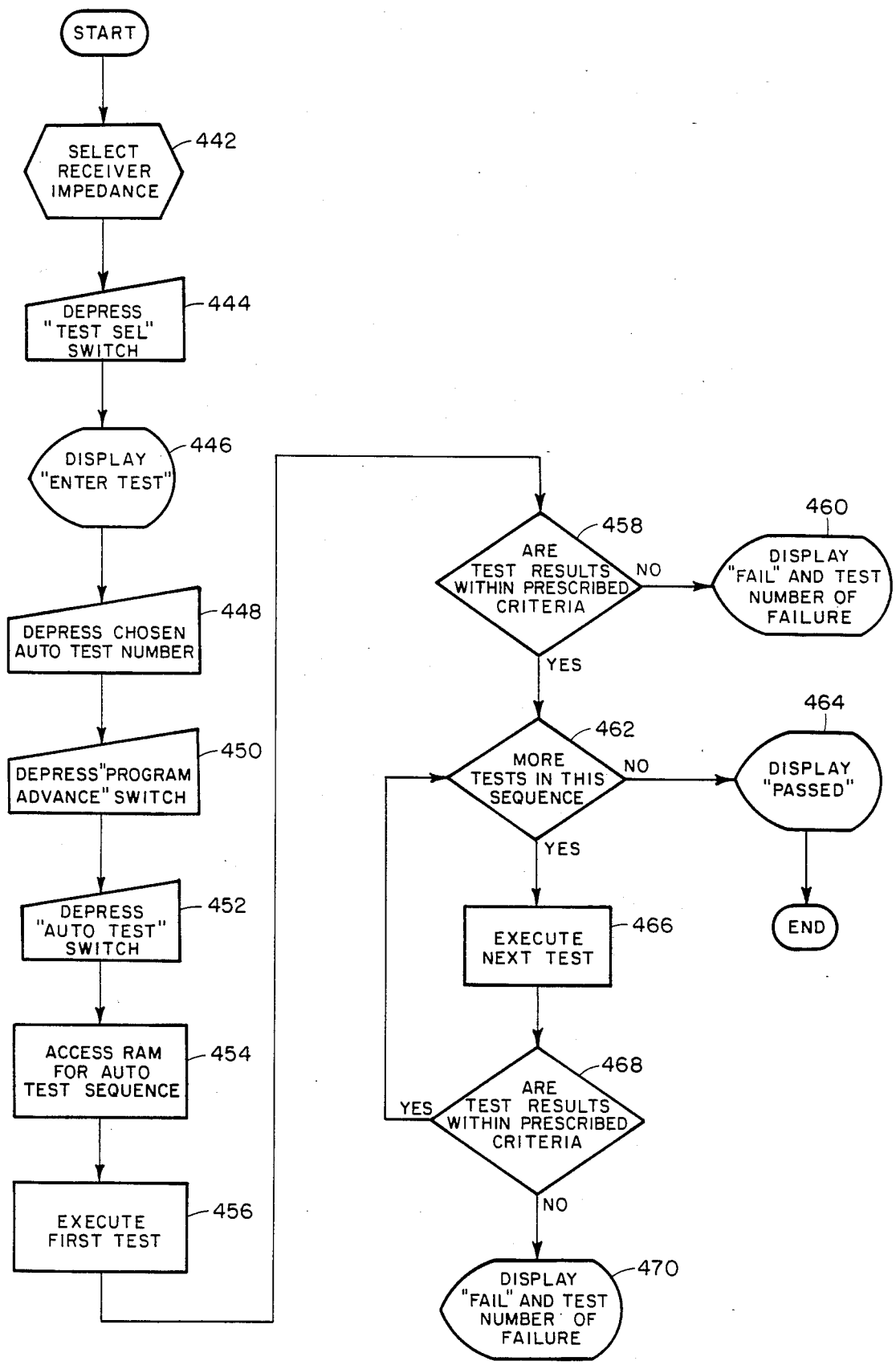
FIG. 13 is a flow chart of the auto test sequence performed by the universal headset tester when using optional automatic testing.

After a test sequence has been entered, tester 10 may be used to automatically perform the test sequence, as shown in FIG. 13. The user should first make sure that RCV impedance switch 112 is properly set (442). The "TEST SEL" switch 68 is then depressed (444), producing the message "enter test" at display 86 (446). The user then enters the desired auto test by pushing the appropriate digit keys (448), and depressing "program advance" switch 46 (450). After the auto test number is entered, the user may begin automatic testing by depressing "auto test" switch 48 (452).

In initiating an auto test, tester 10 will first access RAM 154 or the optional external memory storage device and load the test sequence (454). After the first test is executed (456), micro-controller 150 will examine the test results to see if they are within the prescribed criteria (458). If not, a failure message will be displayed along with the test number (460). If the first test is passed, micro-controller 150 will check to see if there are more tests in the sequence (462). Whenever all tests are complete, the message "passed" will be displayed (464). If there are more tests in the sequence, the next test will be executed (466), the results checked (468), a failure message displayed if the results are improper (470), and so on until either a failure occurs or all test are successfully completed.

Although the invention has been described with reference to specific embodiments, this description is not meant to be construed in a limiting sense. Various modifications of the disclosed embodiment, as well as alternative embodiments of the invention will become apparent to persons skilled in the art upon reference to the description of the invention. It is therefore contemplated that the appended claims will cover such modifications that fall within the true scope of the invention.

I claim:

1. An apparatus for testing a telephone headset having a microphone and a speaker, comprising:
   means for injecting a test signal into said headset, said injecting means providing a receive electric signal to said speaker and a transmit acoustic signal to said microphone;
   means for receiving an output signal from said headset, said receiving means capturing a receive acoustic signal from said speaker, corresponding to said receive electric signal, and further capturing a transmit electric signal from said microphone, corresponding to said transmit acoustic signal; and
   means for analyzing said output signal whereby various performance qualities of said headset may be ascertained, said analyzing means checking reception and transmission qualities of said headset by analyzing said receive acoustic signal and said transmit electric signal.

2. The apparatus of claim 1 wherein said analyzing means further comprises means for determining distortion of said receive acoustic signal and said transmit electric signal.

3. The apparatus of claim 2 wherein said injecting means includes selectable gain means for providing said receive electric signal at varying amplitudes, whereby reception limiting qualities of said headset may be ascertained.

4. The apparatus of claim 3 wherein said analyzing means further comprises means for measuring current consumption by said headset.

5. The apparatus of claim 4 wherein said injecting means includes means for reversing polarity of power supplied to said headset.

6. The apparatus of claim 5 wherein said headset consists of a bottom unit and a top unit, further comprising means for selecting testing of both said bottom and top units, said bottom unit only, or said top unit only.

7. The apparatus of claim 6 further comprising means for checking an external power supply for said headset.

8. The apparatus of claim 7 further comprising means for supplying varying levels of power to said headset.

9. The apparatus of claim 1 wherein said analyzing means further comprises means for measuring current consumption by said headset.

10. The apparatus of claim 1 wherein said injecting means includes means for reversing polarity of power supplied to said headset.

11. The apparatus of claim 1 wherein said headset consists of a bottom unit and a top unit, further comprising means for selecting testing of both said bottom and top units, said bottom unit only, or said top unit only.

12. The apparatus of claim 1 further comprising means for checking an external power supply for said headset.

13. The apparatus of claim 1 further comprising means for supplying varying levels of power to said headset.

14. The apparatus of claim 1 further comprising means for programming test sequences, whereby said apparatus may automatically test a plurality of said various performance qualities.

15. The apparatus of claim 1 wherein said receive electric signal comprises a signal having more than one audible frequency.

16. The apparatus of claim 1 wherein said transmit acoustic signal comprises a signal having more than one audible frequency.

17. A device for testing various performance qualities of a telephone headset, said headset consisting of a bottom unit and a top unit, said bottom unit having one or more connecting jacks and having a first QD connector, said top unit having a second QD connector for connection to said first QD connector, and said top unit further including a microphone and a speaker, said device comprising:
keyboard means;
processor means responsive to said keyboard means;
display means operatively connected to said processor means; and
means for coupling said processor means to said headset, said processor means further including:
internal memory means for storing processing data;
means for injecting a receive electric signal to said speaker and a transmit acoustic signal to said microphone;
means for receiving a receive acoustic signal from said speaker, corresponding to said receive electric signal, and a transmit electric signal from said microphone, corresponding to said transmit acoustic signal; and
means for analyzing said receive acoustic signal and said transmit electric signal;
whereby transmission and reception qualities of said headset are correlated to numbers which are displayed on said display means.

18. The device of claim 17 wherein said coupling means includes:
a first acoustic coupler for attachment to said microphone of said top unit;
a second acoustic coupler for attachment to said speaker of said top unit;
first connection means for receiving said jacks of said bottom unit of said headset; and
second connection means for receiving either said first or said second QD connectors, each of said first and second acoustic couplers and said first and second connection means being connected to said processing means.

19. The device of claim 18 further comprising:
a test port connected to said processor means;
electric cable means having first and second ends, said first end connected to said test port; and
a remote test head connected to said second end of said cable means, each of said first and second acoustic couplers and said first and second connection means being connected to said remote test head.

20. The device of claim 19 wherein said test head further includes third connection means for receiving an external power supply used with said headset, and wherein said processor means includes means for measuring the power level of said external power supply.

21. The device of claim 20 wherein said display means includes means for indicating whether: (1) both of said top and bottom units are being tested; (2) said bottom unit only is being tested; (3) said top unit only is being tested; or (4) said external power supply is being tested.

22. The device of claim 17 wherein said processor means includes means for supplying said headset with varying power levels.

23. The device of claim 22 wherein said display means includes means for indicating which of said power levels is being supplied to said headset.

24. The device of claim 17 wherein said analyzing means further comprises means for determining distortion of said receive acoustic signal and said transmit electric signal.

25. The device of claim 24 wherein said injecting means includes selectable gain means for providing said receive electric signal at varying amplitudes, whereby reception limiting qualities of said headset may be ascertained.

26. The device of claim 25 wherein said analyzing means further comprises means for measuring current consumption by said headset.

27. The device of claim 26 wherein said display means includes:
an alphanumeric display panel for displaying the values of said receive acoustic signal, said transmit electric signal, said distortion of said receive acoustic signal and said transmit electric signal, said reception limiting qualities, and said current consumption; and
means for indicating units of said values.

28. The device of claim 17 further comprising means for programming said processor means whereby said device automatically performs testing of said various performance qualities.

29. The device of claim 28 further comprising optional external memory means for storing information related to said programming of said processor means.

30. The device of claim 17 wherein said receive electric signal comprises a signal having more than one audible frequency.

31. The device of claim 17 wherein said transmit acoustic signal comprises a signal having more than one audible frequency.

32. A universal headset tester for testing reception, transmission, reception distortion, transmission distortion, reception limiting, and current consumption of a telephone headset, said headset consisting of a bottom unit and a top unit, said bottom unit having one or more connecting jacks and having a first QD connector, said top unit having a second QD connector for connection to said first QD connector, and said top unit further including a microphone and a speaker, said universal headset tester comprising:

a keyboard;
processor means responsive to said keyboard, said processor means including:
  (a) internal random access memory for storing processing data;
  (b) means for injecting a receive electric signal to said speaker and a transmit acoustic signal to said microphone;
  (c) means for receiving (i) a receive acoustic signal from said speaker, corresponding to said receive electric signal, and (ii) a transmit electric signal from said microphone, corresponding to said transmit acoustic signal;
  (d) means for analyzing said receive acoustic signal and said transmit electric signal;
  (e) selectable gain means for providing said receive electric signal at varying amplitudes;
  (f) means for supplying said headset with first, second, and third power levels;
  (g) means for determining distortion of said receive acoustic signal and said transmit electric signal; and
  (h) means for measuring current consumption by said headset;
first, second, and third unit type annunciators connected to said processor means, said first unit type annunciator being illuminated when both said top and bottom units are being test, said second unit type annunciator being illuminated when said top unit only is being tested, and said third unit type annunciator being illuminated when said bottom unit only is being tested;
first, second, and third power annunciators connected to said processor means, said first power annunciator being illuminated when said first power level is being supplied to said headset, said second power annunciator being illuminated when said second power level is being supplied to said headset, and said third power annunciator being illuminated when said third power level is being supplied to said headset;
an alphanumeric display panel connected to said processor means;
first, second, third, fourth, and fifth units annunciators connected to said processor means for indicating units of numbers displayed on said display panel;
a test port connected to said processor means;
a multi-wire cable having first and second ends, said first end connected to said test port; and
a remote test head comprising;
  a cable connector for receiving said second end of said cable;
  a first acoustic coupler for attachment to said microphone of said top unit;
  a second acoustic coupler for attachment to said speaker of said top unit;
  first connection means for receiving said jacks of said bottom unit of said headset; and
  second connection means for receiving either said first or said second QD connectors, each of said first and second acoustic couplers and said first and second connection means being attached to said test head and being connected, through said cable and said test port, to said processor means.

33. The universal headset tester of claim 32 further comprising means for programming said processor means whereby said tester automatically performs any combination of said reception, transmission, reception distortion, transmission distortion, reception limiting, and current consumption testing.

34. The universal headset tester of claim 33 further comprising optional external memory means for storing information related to said programming of said processor means.

35. The universal headset tester of claim 32 further comprising means for reversing polarity of said power provided to said headset.

36. The universal headset tester of claim 32 further comprising means for calibrating said receive electric signal and said transmit acoustic signal.

37. The universal headset tester of claim 32 wherein said receive electric signal comprises a signal having more than one audible frequency.

38. The universal headset tester of claim 32 wherein said transmit acoustic signal comprises a signal having more than one audible frequency.

* * * * *